United States Patent
Tashiro et al.

(10) Patent No.: US 11,148,402 B2
(45) Date of Patent: Oct. 19, 2021

(54) HEAT-RESISTANT MULTILAYER CONTAINER AND METHOD FOR PRODUCING THE SAME

(71) Applicant: TOYO SEIKAN GROUP HOLDINGS, LTD., Tokyo (JP)

(72) Inventors: Yuuki Tashiro, Yokohama (JP); Takayuki Ishihara, Yokohama (JP); Azusa Otsuki, Yokohama (JP); Kenji Ichikawa, Yokohama (JP); Toshiki Yamada, Yokohama (JP); Seishi Yoshikawa, Yokohama (JP); Koki Shibata, Yokohama (JP)

(73) Assignee: TOYO SEIKAN GROUP HOLDINGS, LTD., Tokyo (JP)

(*) Notice: Subject to any disclaimer, the term of this patent is extended or adjusted under 35 U.S.C. 154(b) by 0 days.

(21) Appl. No.: 17/269,379

(22) PCT Filed: Aug. 30, 2019

(86) PCT No.: PCT/JP2019/034107
§ 371 (c)(1),
(2) Date: Feb. 18, 2021

(87) PCT Pub. No.: WO2020/050165
PCT Pub. Date: Mar. 12, 2020

(65) Prior Publication Data
US 2021/0197538 A1    Jul. 1, 2021

(30) Foreign Application Priority Data
Sep. 7, 2018    (JP) .............................. JP2018-167498

(51) Int. Cl.
*B32B 27/08* (2006.01)
*B32B 27/32* (2006.01)

(52) U.S. Cl.
CPC .............. *B32B 27/08* (2013.01); *B32B 27/32* (2013.01); *B32B 2307/306* (2013.01);
(Continued)

(58) Field of Classification Search
CPC ..... B32B 27/08; B32B 27/32; B32B 2439/70; B32B 2307/738; B32B 2307/734; B32B 2307/306; B32B 2307/718
See application file for complete search history.

(56) References Cited

U.S. PATENT DOCUMENTS

2015/0251390 A1    9/2015    Ishihara et al.
2017/0183426 A1    6/2017    Kawai et al.

FOREIGN PATENT DOCUMENTS

JP    7-171936 A    7/1995
JP    7-304877 A    11/1995
(Continued)

OTHER PUBLICATIONS

International Search Report for PCT/JP2019/034107 dated Oct. 1, 2019 (PCT/ISA/210).

*Primary Examiner* — Michael C Miggins
(74) *Attorney, Agent, or Firm* — Sughrue Mion, PLLC (57) ABSTRACT

A multilayer container including: an outermost layer (1) containing a propylene-based polymer A containing homopolypropylene as a main component having a melt flow rate in a range of 2.0 to 10.0 g/10 min; an inner layer (2) containing 50 to 99% by weight of a propylene-based polymer B containing homopolypropylene as a main component having a melt flow rate of not more than 5.0 g/10 min and an isotactic index of not less than 93%, and 1 to 50% by weight of an ethylene-α-olefin copolymer C; and a barrier layer (4) occupying 5 to 20% by weight of the whole container. The ratio (L/D) of container height (L) to diameter (D) is not less than 0.5, and a volume shrinkage based on
(Continued)

volume measured before and after heat sterilization at 121° C. for 30 minutes is not more than 5%.

8 Claims, 1 Drawing Sheet

(52) U.S. Cl.
CPC ... *B32B 2307/718* (2013.01); *B32B 2307/734* (2013.01); *B32B 2307/738* (2013.01); *B32B 2439/70* (2013.01)

(56) References Cited

FOREIGN PATENT DOCUMENTS

| | | | |
|---|---|---|---|
| JP | 9-77132 | A | 3/1997 |
| JP | 9-109340 | A | 4/1997 |
| JP | 10-236453 | A | 9/1998 |
| JP | 2002-193233 | A | 7/2002 |
| JP | 2002-240813 | A | 8/2002 |
| JP | 2014-69864 | A | 4/2014 |
| JP | 2016-11164 | A | 1/2016 |
| JP | 2016-28139 | A | 2/2016 |

HEAT-RESISTANT MULTILAYER CONTAINER AND METHOD FOR PRODUCING THE SAME

CROSS REFERENCE TO RELATED APPLICATIONS

This application is a National Stage of International Application No. PCT/JP2019/034107 filed Aug. 30, 2019, claiming priority based on Japanese Patent Application No. 2018-167498 filed Sep. 7, 2018.

TECHNICAL FIELD

The present invention relates to a multilayer container containing a propylene-based polymer as a main material. More particularly, the present invention relates to a heat-resistant multilayer container excellent in glossiness and impact resistance, and can be used for retort sterilization.

BACKGROUND ART

Conventional multilayer containers have glossy outer surfaces, and such a container has an outer layer comprising homopolypropylene or a propylene-based random copolymer.

Propylene-based polymers used for imparting glossiness to the multilayer container having excellent glossiness are usually inferior in drop impact strength. In order to improve the mechanical strength of the multilayer container, application of a polyethylene resin layer having excellent impact resistance for an inner layer has been proposed (see Patent document 1).

Patent Document 2 below proposes a deep-drawn container having a depth/diameter ratio of not less than 0.5. This container is formed by preparing a sheet of an outer surface layer material (X) comprising 70-99% by weight of propylene-based resin (A) having MFR (230° C.) of 0.4 to 6.0 g/10 min and a melting point of 150 to 170° C., and 1 to 30% by weight of a styrene-based elastomer resin (B) having MFR (200° C.) of 0.5 to 20.0 g/10 min and a styrene content of 5 to 35% by weight, applying the sheet to at least either the inner layer or the outer layer, and thermoforming the sheet. The container has a haze value of not more than 7% at the side surface and a gloss value of not less than 120%. This container further has an excellent impact resistance at a low temperature.

PRIOR ART DOCUMENTS

Patent Documents

[Patent Document 1] JP-A-H09-109340
[Patent Document 2] JP-A-2016-11164

SUMMARY OF THE INVENTION

Problem to be Solved by the Invention

Patent Document 1 provides a multilayer container having an outer layer of a propylene-based polymer excellent in glossiness and an inner layer of polyethylene. In this case, the impact resistance may be improved, but since polyethylene is inferior to the propylene-based polymer in heat resistance, the container cannot be used for retort sterilization and the like. Use of polyethylene as a blend with a propylene-based polymer can cause another problem. Namely, due to the poor compatibility between the polyethylene and the propylene-based polymer, the transparency may deteriorate. This problem can arise also in a case of using a regrind resin that is generated during forming of a multilayer container using polyethylene together with a propylene-based polymer.

The deep-drawn container described in Patent Document 2 has excellent transparency and glossiness. Furthermore, the impact resistance at a low temperature is improved by providing a surface layer sheet containing a styrene-based elastomer. However, its heat resistance still cannot be regarded as satisfactory, and it is difficult to use the container for retort sterilization.

Accordingly, it is an object of the present invention to provide a multilayer container having excellent transparency, glossiness and impact resistance, and also having excellent heat resistance so that the container can be used for retort sterilization and the like.

Means for Solving the Problems

The present invention provides a heat-resistant multilayer container comprising:

an outermost layer comprising a propylene-based polymer A containing homopolypropylene as a main component having a melt flow rate in a range of 2.0 to 10.0 g/10 min, an inner layer comprising 50 to 99% by weight of a propylene-based polymer B containing homopolypropylene as a main component having a melt flow rate of not more than 5.0 g/10 min and an isotactic index of not less than 93%, and 1 to 50% by weight of an ethylene-α-olefin copolymer C, and a barrier layer occupying 5 to 20% by weight of the whole container.

The multilayer container has a ratio (L/D) of container height (L) to diameter (D) of not less than 0.5, and a volume shrinkage of not more than 5% based on volume measured before and after heat sterilization at 121° C. for 30 minutes.

It is preferable in the heat-resistant multilayer container of the present invention that:
1. the inner layer comprises a high melt tension polypropylene D in an amount of 1 to 20% by weight;
2. the propylene-based polymer A and/or the propylene-based polymer B contains 0.001 to 5 parts by weight of crystal nucleating agent per 100 parts by weight of each of the propylene-based polymer A and the propylene-based polymer B;
3. the barrier layer is composed of an ethylene-vinyl alcohol copolymer, or comprises an ethylene-vinyl alcohol copolymer as a blend of at least two types of ethylene-vinyl alcohol copolymers different from each other in ethylene contents;
4. the ethylene-α-olefin copolymer C is a resin composition comprising a blend of at least two types of ethylene-α-olefin copolymers of α-olefins different from each other in carbon numbers; and
5. the barrier layer is an oxygen-absorbing barrier layer.

The present invention further provides a method for producing a heat-resistant multilayer container, the method comprising:
preparing a multilayer sheet comprising:
an outermost layer comprising a propylene-based polymer A containing homopolypropylene as a main component having a melt flow rate in a range of 2.0 to 10.0 g/10 min,
an inner layer comprising 50 to 99% by weight of a propylene-based polymer B containing homopolypropylene as a main component having a melt flow rate of not more than 5.0 g/10 min and an isotactic index of not less than 93%, and 1 to 50% by weight of an ethylene-α-olefin copolymer C, and a barrier layer occupying 5 to 20% by weight of the whole container, heating the multilayer sheet to a temperature in a range of 150 to 190° C., and thermoforming the sheet to have a deep-drawn shape having a ratio (L/D) of container height (L) to diameter (D) of not less than 0.5.

It is preferable in the method for producing a heat-resistant multilayer container of the present invention that the thermoforming is pressure forming.

In the present Description, the numerical value of the melt flow rate (hereinafter this may be referred to simply as "MFR") is a value measured at 230° C. and 2.16 kg load in accordance with JIS K7210.

Effect of the Invention

It is possible to impart the multilayer container of the present invention with excellent impact resistance by using an inner layer as a combination of a propylene-based polymer B containing homopolypropylene as a main component having MFR of not more than 5.0 g/10 min and an ethylene-α-olefin copolymer C. Further, use of a propylene-based polymer A containing homopolypropylene as a main component having MFR of 2.0 to 10.0 g/10 min for an outer layer can impart excellent glossiness to the outer surface of the multilayer container. In addition, the multilayer container of the present invention has excellent heat resistance, namely, its volume shrinkage based on volume measured before and after heat sterilization at 121° C. for 30 minutes is not more than 5%, so that the container can be used for retort sterilization.

In the method for producing a multilayer container of the present invention, it is possible to produce a multilayer container imparted with glossiness, impact resistance and heat resistance with favorable formability.

MODE FOR CARRYING OUT THE INVENTION (Heat-Resistant Multilayer Container)

An important characteristic of the heat-resistant multilayer container of the present invention is that the container comprises:

an outermost layer comprising a propylene-based polymer A containing homopolypropylene as a main component having a melt flow rate in a range of 2.0 to 10.0 g/10 min, an inner layer comprising 50 to 99% by weight of a propylene-based polymer B containing homopolypropylene as a main component having a melt flow rate of not more than 5.0 g/10 min and an isotactic index of not less than 93%, and 1 to 50% by weight of an ethylene-α-olefin copolymer C, and a barrier layer occupying 5 to 20% by weight of the whole container.

The multilayer container has excellent formability and impact resistance even when it is formed as a deep-drawn container having a ratio (L/D) of container height (L) to diameter (D) of not less than 0.5. In addition, the container has an excellent heat resistance, namely, it has a volume shrinkage of not more than 5% based on volume measured before and after heat sterilization at 121° C. for 30 minutes.

[Outermost Layer]

It is preferable that the propylene-based polymer A forming the outermost layer of the multilayer container in the present invention contains a homopolypropylene (hereinafter, this homopolypropylene may be referred to as "high-MFR homopolypropylene") as a main component having MFR in the range of 2.0 to 10.0 g/10 min. In other words, the homopolypropylene occupies not less than 80% by weight and in particular, 100% by weight of the propylene-based polymer A.

The homopolypropylene preferably has MFR in the range of 2.0 to 10 g/10 min, and particularly 2.0 to 5.0 g/10 min. When the MFR is smaller than this range, the multilayer container cannot be imparted with a desired surface glossiness and transparency due to inferior fluidity. When the MFR is larger than this range, a drawdown may occur to impair the formability. The homopolypropylene preferably has a high crystallinity, specifically an isotactic index of not less than 90%, and in particular not less than 95%.

Here, an isotactic index indicates an isotactic fraction in pentad unit in a polypropylene molecular chain measured using a nuclear magnetic resonance spectrum (13C-NMR) with isotopic carbon.

In the present invention, a propylene·α-olefin random copolymer can be exemplified as another propylene-based polymer that can be contained in the propylene-based polymer A. Examples of α-olefin in the propylene·α-olefin random copolymer include: ethylene, butene-1, pentene-1, hexene-1, octene-1, and 4-methylpentene-1. It is particularly preferable to contain a propylene·ethylene random copolymer containing not less than 80% by weight of a structural unit of propylene, particularly 95 to 99% by weight, and the residual structural unit comprising an α-olefin, particularly ethylene.

It is also possible to add conventionally-known additives for resins to the propylene-based polymer A according to conventionally-known formulations, and examples of the additives include a heat stabilizer, an antioxidant, a lubricant, an inorganic filler, a colorant, and a crystal nucleating agent. Addition of the crystal nucleating agent will be described later.

[Inner Layer]

It is important that the inner layer of the multilayer container in the present invention contains a propylene-based polymer B containing homopolypropylene as a main component having MFR of not more than 5.0 g/10 min and an isotactic index of not less than 93%, and an ethylene-α-olefin copolymer C at a weight ratio of B:C=50:50 to 99:1, and particularly 70:30 to 97:3. When the content of the ethylene-α-olefin copolymer is smaller than this range, the impact resistance may be inferior as compared with the case where the content is within this range. When the content of the ethylene-α-olefin copolymer is larger than this range, the heat resistance may be inferior as compared with the case where the content is within this range.

<Propylene-Based Polymer B>

It is suitable that the propylene-based polymer B contains homopolypropylene having a melt flow rate of not more than 5.0 g/10 min and an isotactic index of not less than 93% in an amount of not less than 80% by weight, particularly 100% by weight, in the propylene-based polymer B, as a main component (hereinafter, this homopolypropylene may be referred to as "low MFR homopolypropylene").

It is suitable that the MFR of the homopolypropylene is in the range of not more than 5.0 g/10 min, particularly 0.4 to 2.0 g/10 min. When the MFR is larger than this range, the multilayer container cannot have the desired impact resistance. When the MFR is excessively low, the fluidity may be degraded and the formability may be impaired.

It is also important that the homopolypropylene has a high crystallinity with an isotacic index of not less than 93%, particularly not less than 95% so that the mechanical strength of the inner layer is improved, and the impact resistance of the multilayer container is remarkably improved. Further, the homopolypropylene can keep its shape without being melted until it is heated to a higher temperature. As a result, the homopolypropylene can reduce a drawdown and impart heat resistance at the time of shaping. In the present invention, since the isotactic index of the low MFR homopolypropylene constituting the propylene-based polymer B is within this range, it is possible to remarkably improve the impact resistance and the heat resistance, and reduce the drawdown.

The propylene-based polymer B may similarly contain other propylene-based polymers or conventionally-known additives for resins such as a heat stabilizer as exemplified for the propylene-based polymer A. Addition of crystal nucleating agent is particularly preferable from the viewpoint of enhancing the crystallinity of the propylene-based polymers A and B and improving the formability and transparency.

The crystal nucleating agent does not exhibit compatibility with the propylene-based polymers A and B. The examples include conventionally-known crystal nucleating agents such as metal salts of organic carboxylic acids like benzoic acid, malonic acid, and succinic acid; organic nucleating agents like lithium salts, sodium salts, potassium salts, magnesium salts, calcium salts, and organic phosphate ester salts; and inorganic nucleating agents like talc, alum, silica, titanium oxide, and calcium oxide, though the present invention is not limited to these examples. Among them, organophosphate salts can be used suitably in particular.

It is desirable that the crystal nucleating agent is added in an amount of 0.001 to 5 parts by weight, particularly 0.01 to 0.5 parts by weight per 100 parts by weight of each of the propylene-based polymers A and B. When the amount of the crystal nucleating agent is smaller than this range, the crystallinity cannot be improved sufficiently. When the amount is more than this range, formability may be impaired.

<Ethylene-α-Olefin Copolymer>

The ethylene-α-olefin copolymer C that can be used here is obtained by copolymerizing ethylene and at least one kind of α-olefin selected from α-olefins having 3 to 20 carbon atoms. By making the inner layer contain the ethylene-α-olefin copolymer in this amount, excellent impact resistance can be imparted to the multilayer container. As is particularly evident from the results of Examples (Comparative Examples 1 and 4) described later, a multilayer container comprising a barrier layer of a layer formed of an ethylene-vinyl alcohol copolymer may easily lose its impact resistance. However, the impact resistance can be improved by blending the ethylene-α-olefin copolymer. Examples of commercially-available products include "TAFMER" (trade name) manufactured by Mitsui Chemicals, Inc., "ULTZEX" (trade name) manufactured by Prime Polymer Co., Ltd., and "AFFINITY" (trade name) manufactured by Dow Chemical Company.

Examples of the α-olefin include 1-buten, 1-penten, 1-hexen, 1-hepten, 1-octen, 1-nonen, 1-decen, 1-hexadecen, 1-eicosene, 4-methyl-1-penten, and 4-methyl-1-hexen. Among them, 1-buten and 4-methyl-1-penten can be used particularly suitably.

It is preferable that the ethylene-α-olefin copolymer contains the α-olefin in a content relative to the total structural unit in the range of 1 to 30 mol %. When the content of α-olefin is larger than this range, the heat resistance may be impaired. When the content of α-olefin is smaller than this range, the impact resistance may not be sufficiently improved compared to a copolymer containing the α-olefin in this range.

The ethylene-α-olefin copolymer preferably has MFR in the range of 0.5 to 20 g/10 min. When the MFR is larger than this range, a desired impact resistance may not be imparted. When the MFR is lower than this range, fluidity may be degraded to impair the formability.

The ethylene-α-olefin copolymer has preferably a density of 0.850 to 0.930 g/cm$^3$ from the viewpoint of transparency.

The ethylene-α-olefin copolymer may be used alone or as a blend with at least one of the other ethylene-α-olefin copolymers. It is particularly suitable to blend a copolymer having α-olefin of a linear structure and a copolymer having α-olefin of a branched structure (Example 8).

<High Melt Tension Propylene-Based Polymer>

It is preferable that the inner layer of the present invention contains a high melt tension propylene-based polymer together with the aforementioned propylene-based polymer and ethylene-α-olefin copolymer, in an amount of 1 to 20% by weight, particularly 5 to 15% by weight of the entire inner layer, thereby preventing a drawdown during forming of the container and improving formability, and thus, a container having a uniform thickness can be formed.

The high melt tension propylene-based polymer has a structure provided by introducing a long branched chain into or crosslinking with the main chain of the propylene-based polymer. The tension during melting is increased, and preferably, the melt tension (230° C.) is in a range of 100 to 500 mN.

The high melt tension propylene-based polymer may be any of a propylene homopolymer, a propylene-ethylene random copolymer, or a propylene-ethylene block copolymer. From the viewpoint of heat resistance and transparency, a propylene homopolymer is preferred.

The high melt tension propylene-based polymer preferably has MFR in the range of 0.5 to 5.0 g/10 min from the viewpoint of improving formability.

[Multilayer Structure]

The multilayer container of the present invention comprises an outermost layer formed of a propylene-based polymer A formed of the high-MFP homopolypropylene and an inner layer formed of a propylene-based polymer B of a low MFR homopolypropylene and an ethylene-α-olefin copolymer. These outermost layer and inner layer are essential components. The multilayer container may be composed of these two layers, or it may include conventionally-known layers such as a gas barrier layer, an oxygen absorbing layer, an adhesive layer, a regrind layer, and an adsorbent-containing layer. Examples of the layer constitution are described below though the present invention is not limited to these examples.

Figure 1:
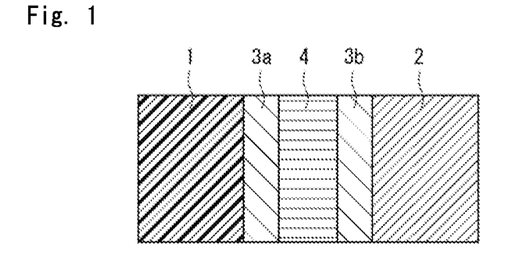
FIG. 1: a diagram showing an example of a layer constitution of a multilayer container of the present invention.

FIG. 1 shows an example of a layer constitution of a multilayer container of the present invention. This example has an outermost layer 1 formed of a propylene-based polymer A and an inner layer 2 formed of a propylene-based polymer B and an ethylene-α-olefin copolymer. A gas barrier layer 4 is formed as an intermediate layer. That is, the container has a layer constitution: outermost layer 1/outer layer side adhesive layer 3a/gas barrier layer 4/inner layer side adhesive layer 3b/inner layer 2, in this order when viewed from the outer layer side, whereby the multilayer container is imparted with a gas barrier property.

Figure 2:
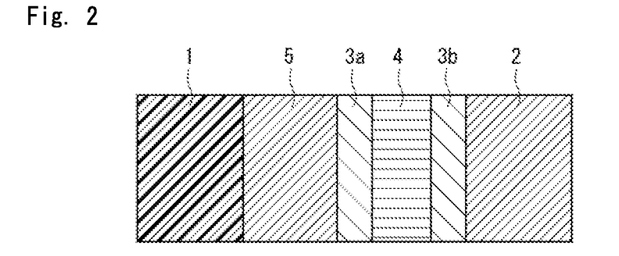
FIG. 2: a diagram showing another example of a layer constitution of a multilayer container of the present invention.
Figure 3:
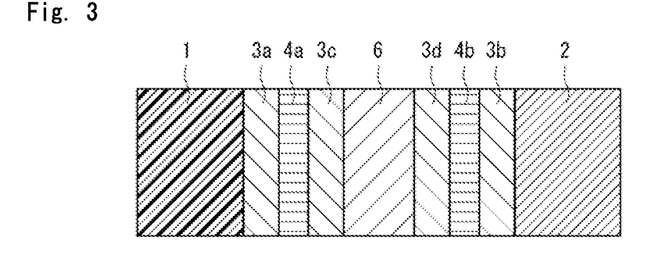
FIG. 3: a diagram showing another example of a layer constitution of a multilayer container of the present invention.

The multilayer container in the embodiment shown in FIG. 2 comprises: outermost layer 1/layer 5 formed of propylene-based polymer B/outer layer side adhesive layer 3a/gas barrier layer 4/inner layer side adhesive layer 3b/inner layer 2. The multilayer container in the embodiment shown in FIG. 3 comprises: outermost layer 1/outer layer side adhesive layer 3a/gas barrier layer 4a/adhesive layer 3c/oxygen-absorbing layer 6 containing a propylene-based polymer B as a matrix resin/adhesive layer 3d/gas barrier layer 4b/inner layer side adhesive layer 3b/inner layer 2. As shown in FIGS. 2 and 3, the impact resistance of the multilayer container can be further improved because a layer formed of the propylene-based polymer B is provided in addition to the inner layer. Though the propylene-based polymer A that composes the layer 5 proximate to the outermost layer is inferior in the impact resistance, the impact resistance at the outermost layer side also can be improved.

Figure 4:
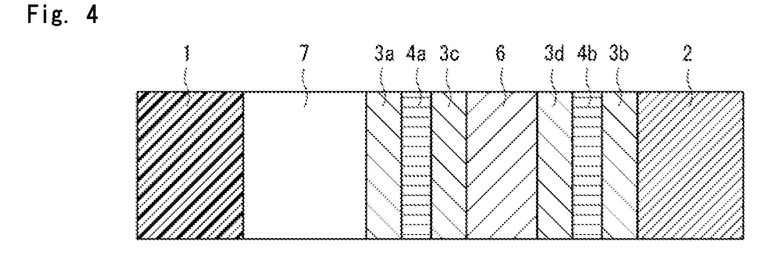
FIG. 4: a diagram showing another example of a layer constitution of a multilayer container of the present invention.

As shown in FIG. 4, it is possible to form a regrind layer 7 between the outermost layer 1 and the gas barrier layer 4a (and/or between the inner layer 2 and the gas barrier layer 4b) in the embodiment shown in FIG. 3. This regrind layer 7 is formed of a regrind resin generated during forming of the container.

Figure 5:
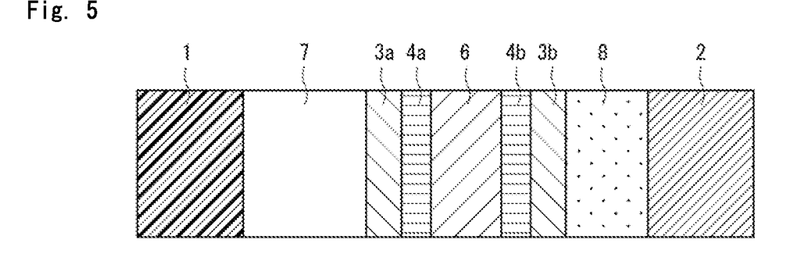
FIG. 5: a diagram showing another example of a layer constitution of a multilayer container of the present invention.

The container of the embodiment shown in FIG. 5 comprises: outermost layer 1/regrind layer 7/outer layer side adhesive layer 3a/gas barrier layer 4a/oxygen-absorbing layer 6 containing a gas barrier resin as a matrix resin/gas barrier layer 4b/inner layer side adhesive layer 3b/adsorbent-containing layer 8/inner layer 2. It is possible to improve the content flavor retention by forming an adsorbent-containing layer 8 on the inner layer side. The adsorbent-containing layer 8 contains an adsorbent such as zeolite.

It is difficult to define the thickness of each layer of the multilayer container according to the present invention, because the thickness may vary depending on factors such as the shape of the multilayer container and the producing method. In the case of thermoforming such as pressure forming as described later, it is preferable that the thickness of the outermost layer is in the range of 10 to 80 μm, particularly 20 to 60 μm, and the thickness of the inner layer is in the range of 390 to 320 μm, particularly 380 to 340 μm at the body portion that is the thinnest part of the multilayer container. When a layer of the propylene-based polymer B is formed in addition to the inner layer, it is preferable that the total thickness of this layer and the inner layer is within the aforementioned range.

It is desirable that the thickness of the outermost layer formed of the propylene-based polymer A in the container body portion is not more than 20%, particularly not more than 10%, of the total thickness in the body portion of the multilayer container. By controlling the thickness of the outermost layer formed of the propylene-based polymer A and the inner layer formed of the propylene-based polymer B and the ethylene-α-olefin copolymer (any layer other than the inner layer may be included if the layer contains the propylene-based polymer B), it is possible to provide an optimal impact resistance while maintaining the surface glossiness of the multilayer container.

When the outermost layer and the inner layer each has a thickness in the above-mentioned range, the thickness of the other layers formed on the multilayer container of the present invention is as follows: the gas barrier layer preferably has a thickness (total thickness if a plurality of the gas barrier layers are formed) in the range of 20 to 80 μm, particularly in the range of 40 to 60 μm; and the oxygen-absorbing layer preferably has a thickness in the range of 10 to 60 μm, particularly in the range of 20 to 40 μm. In a case of providing a regrind layer, this layer is preferably formed to have a thickness in a range of 50 to 350 μm. In this manner, it is possible to exhibit sufficient gas barrier property and oxygen-absorbing property without impairing the impact resistance and formability. In a case of providing an adsorbent-containing layer, the layer is preferably formed to have a thickness in the range of 10 to 100 μm.

[Gas Barrier Layer]

For the gas barrier layer of the multilayer container in the present invention, any conventionally known barrier resins can be used. In particular, a gas barrier layer of an ethylene-vinyl alcohol copolymer is preferred. For the ethylene-vinyl alcohol copolymer, for instance, a saponified copolymer is suitably used from the viewpoint of gas barrier property. This saponified copolymer is obtained by saponifying an ethylene-vinyl acetate copolymer containing ethylene in the range of 20 to 60 mol %, particularly 25 to 50 mol % to have a saponification degree of not less than 96%, in particular not less than 99 mol %. In the present invention, it is particularly preferable that an ethylene-vinyl alcohol copolymer having an ethylene content of 20 to 35 mol % and an ethylene-vinyl alcohol copolymer having an ethylene content of 36 to 50 mol % are blended at a ratio in the range of 90:1.0 to 50:50, particularly 80:20 to 60:40 (weight ratio) in use. As a result, the gas barrier layer is improved in formability while maintaining its excellent gas barrier property, and thus, it is possible to form a multilayer container having a substantially uniform appearance.

This ethylene-vinyl alcohol copolymer is required to have a molecular weight sufficient to form a film, and usually it is desirable to have an intrinsic viscosity of not less than 0.01 dl/g, particularly not less than 0.05 dl/g in a mixed solvent having a weight ratio of [phenol/water] of 85/15, in a measurement at 30° C.

Examples of the gas barrier resin other than the ethylene-vinyl alcohol copolymer include polyamides such as nylon 6, nylon 6·6, nylon 6/6·6 copolymer, metaxylylene diazipamide (MXD6), nylon 6·10, nylon 11, nylon 12, and nylon 13. Among them, polyamides having 5 to 50 amide groups or particularly 6 to 20 amide groups per 100 carbon atoms are suitable. These polyamides are also required to have a molecular weight sufficient to form a film, and for instance, it is desirable that the relative viscosity measured at 30° C. in concentrated sulfuric acid (concentration of 1.0 g/dl) is not less than 1.1, particularly not less than 1.5.

The polyamide may be blended in an ethylene-vinyl alcohol copolymer. The preferable blending ratio (weight ratio) of the ethylene-vinyl alcohol copolymer to the polyamide is suitably 50:50 to 99:1.

In a case where polyamide is used as the matrix resin of the oxygen-absorbing resin composition as described later, a polyamide resin having a terminal amino group concentration of not less than 40 eq/10⁶ g is desirable because substantially no oxidative deterioration occurs at the time of oxygen absorption.

[Oxygen Absorbing Layer]

The oxygen-absorbing layer of the multilayer container in the present invention may comprise a resin composition comprising at least an oxidizing organic component and a transition metal catalyst (oxidation catalyst) contained in a matrix resin such as the aforementioned propylene-based polymer, the gas barrier resin or the regrind resin.

(i) Oxidizing Organic Component

An example of the oxidizing organic component is an ethylenically unsaturated group-containing polymer. This polymer has a carbon-carbon double bond. This double bond portion and/or particularly α methylene adjacent to this double bond portion is easily oxidized by oxygen, whereby oxygen is captured.

Examples of the ethylenically unsaturated group-containing polymer that can be used as the oxidizing polymer include a homopolymer of polyene derived from polyene as a monomer, or a random copolymer or a block copolymer formed by combining the polyene with at least one of other polyenes or with any other monomer.

Preferred examples of the polymers derived from polyene include polybutadiene (BR), polyisoprene (IR), natural rubber, nitrile-butadiene rubber (NBR), styrene-butadiene rubber (SBR), chloroprene rubber and ethylene-propylene-diene rubber (EPDM), though the present invention is not limited to these examples.

Oxidizing organic components are not limited to the aforementioned ethylenically unsaturated group-containing polymer, but polymers that are easily oxidized per se can be used therefor. The examples include polypropylene, an ethylene-propylene copolymer, or a polymetaxylylene diazipamide having a terminal amino group concentration of less than 40 eq/10⁶ g.

From the viewpoint of formability and the like, it is preferable that the aforementioned oxidizing polymer and a copolymer thereof have a viscosity in the range of 1 to 200 Pa·s at 40° C.

These polyene-based polymers are preferably acid-modified polyene polymers containing a carboxylic acid group, a carboxylic anhydride group, and a hydroxyl group.

The oxidizing organic component comprising any of these oxidizing polymers or copolymers thereof is preferably contained in the oxygen-absorbing resin in an amount of 0.01 to 10% by weight.

(ii) Transition Metal-Based Catalyst

As the transition metal-based catalyst, metals of Group VIII of the Periodic Table are preferred, and the examples include iron, cobalt, and nickel. Additional examples therefor include Group I metals such as copper and silver, Group IV metals such as tin, titanium and zirconium, Group V metals such as vanadium, Group VI metals such as chromium, and Group VII metals such as manganese.

Transition metal catalysts are usually used in the form of low-valent inorganic salts, organic salts or complex of the transition metals. Examples of the inorganic salt include halides such as chloride, oxysalts of sulfur (e.g., sulfate), oxyacids of nitrogen (e.g., nitrate), phosphooxy salts (e.g., phosphate), and silicates. Examples of the organic salt include carboxylates, sulfonates, and phosphonates. Examples of the complexes of the transition metal include a complex with a β-diketone or a β-ketoacidester.

The transition metal-based catalyst is preferably included in the oxygen-absorbing resin, in the range of 100 to 3000 ppm in terms of concentration of the transition metal atom (on a weight concentration basis).

[Adhesive Layer]

It is possible to form an adhesive layer between layers of the multilayer container of the present invention as required. In particular, when the gas barrier layer is formed of an ethylene-vinyl alcohol copolymer, an adhesive layer is preferably interposed between the gas barrier layer and the inner/outer layer, because the gas barrier layer has poor adhesiveness with the propylene-based polymer of the inner/outer layer.

Examples of the adhesive resin to be used in the adhesive layers include thermoplastic resins containing carbonyl (—CO—) groups based on carboxylic acids, carboxylic anhydrides, carboxylates, carboxylic amides, carboxylic esters or the like in the main chain or the side chain at concentrations of 1 to 700 milliequivalent (meq) per 100 g of resin, particularly 10 to 500 (meq) per 100 g of resin.

Suitable examples of the adhesive resin include an ethylene-acrylic acid copolymer, an ionically crosslinked olefin copolymer, maleic anhydride grafted polyethylene, maleic anhydride modified polypropylene, maleic anhydride grafted polypropylene, acrylic acid grafted polyolefin, ethylene-vinyl acetate copolymer, and a blend of ethylene-vinyl alcohol copolymer and maleic anhydride modified olefin resin. Among them, maleic anhydride modified polypropylene and maleic anhydride grafted polypropylene can be used particularly suitably. The adhesive resin may be used alone or in combination with at least one of other adhesive resins, or it may be blended into a polyolefin-based resin.

[Adsorbent-Containing Layer]

The adsorbent-containing layer formed as required in the multilayer container of the present invention is preferably arranged inside when viewed from the oxygen-absorbing layer, so that migration of the by-product generated by the oxygen absorption reaction into the container is controlled or reduced so as to improve the content flavor retention.

The adsorbent is suitably blended into the propylene-based polymer B or the regrind resin.

Conventionally known adsorbents can be used for this layer. Preferred examples thereof include a porous inorganic material containing silicate as a main component, and the examples include zeolite and a powder of an active white clay obtained by acid-treating a smectite clay mineral like montmorillonite. A high silica zeolite (silica/alumina ratio of not less than 100), which is an Na type ZSM5 zeolite, is particularly preferred since it is excellent in functions of capturing the odor peculiar to plastic and capturing the oxidative decomposition product.

Usually, such adsorbents are suitably blended in the adsorbent-containing layer in an amount from 0.5 to 10% by weight.

(Method for Producing Multilayer Container)

The multilayer container of the present invention can be produced by a conventionally known method for producing a multilayer container.

For instance, a multilayer film or a multilayer sheet is prepared by extrusion coating or sandwich lamination. In an alternative method, films shaped in advance are subjected to dry lamination to prepare a multilayer film or a multilayer sheet. This multilayer sheet is subjected to vacuum forming, pressure forming, or vacuum pressure forming, which may be further subjected to a plug-assisted thermoforming. It is also possible to subject a mass of resin to extrusion-press forming. In these manners, the resin can be formed into a multilayer container shaped as a tray or a cup having a ratio (L/D) of container height (L) to diameter (D) of not less than 0.5.

In another method, a preform having a certain layer structure is prepared by injection forming or extrusion forming. Next, the thus obtained preform is melt-formed by blowing or the like. Alternatively, the layers are joined in a multilayer die where the molten resin is extruded so that the resin for an intermediate layer is incorporated. The molten resin is cut at a part where the intermediate resin layer is not present, introduced into a metal die so as to be press-formed with the core mold, whereby a multilayer container having a ratio (L/D) of container height (L) to diameter (D) of not less than 0.5 is formed.

Among the aforementioned examples of the present invention, methods of shaping a multilayer sheet by vacuum forming, pressure forming, vacuum pressure forming and further a plug-assisted thermoforming of the sheet are preferred. The pressure forming is particularly preferred.

As described above, the multilayer sheet is preferably a multilayer sheet comprising at least: an outermost layer of a propylene-based polymer A containing homopolypropylene as a main component having a melt flow rate of 2.0 to 10.0 g/10 min; an inner layer comprising 50 to 99% by weight of a propylene-based polymer B containing homopolypropylene as a main component having a melt flow rate of not more than 5.0 g/10 min and an isotactic index of not less than 93%, and 1 to 50% by weight of an ethylene-α-olefin copolymer C; and a barrier layer occupying 5 to 20% by weight of the whole container. The multilayer sheet preferably has a thickness in the range of 250 to 4000 μm, and in particular 800 to 2000 μm.

It is particularly preferable to heat the multilayer sheet to a temperature in the range of 150 to 190° C., in particular of 160 to 180° C. for thermoforming the multilayer sheet into a deep-drawn shape having a ratio (L/D) of container height (L) to diameter (D) of not less than 0.5, in particular in the range of 0.8 to 1.5. By setting the high temperature for forming in this manner, the strain in the container can be reduced to improve the heat resistance, and the heat shrinkage can be reduced to less than 3%, as is evidently shown in the results of Examples described later.

EXAMPLES

The present invention will be further described by the following Examples and Comparative Examples, though the present invention is not limited to these Examples.

Measurements and evaluations in each Example and Comparative Example were carried out by the following methods.

(1) Isotactic Index (I.I.)

The isotactic index of the propylene-based polymer was calculated as the isotactic fraction of pentad unit from nuclear magnetic resonance spectra (13C-NMR) measurements with isotopic carbon. 13C-NMR measurement was performed using a nuclear magnetic resonance spectrometer (manufactured by JEOL) while heating to 135° C. From the obtained chart, the ratio of the peak height of 21.82 ppm to the sum of the peak heights of 21.82, 21.57, 21.31, 21.03, 20.82, 20.64, 20.29, 20.17, and 19.88 ppm was calculated, whereby the isotactic index was obtained.

(2) Melt Flow Rate (MFR)

MFR of each material was measured using a melt indexer (manufactured by Toyo Seiki Seisaku-sho Ltd.) in accordance with JIS K7210. Measurement temperature was set to be 230° C., except that the measurement temperature for EVOH was 210° C. and it was 190° C. for the ethylene-α-olefin copolymer used in Example 9. In the measurement, a load of 2160 g was applied.

(3) Density

Density of each material was measured using a micromeritics dry automatic densitometer AccuPyc II 1340 (manufactured by Shimadzu Corporation). Approximately 1.2 g of the finely weighed sample was placed in a cell of 3.5 cm³ so as to conduct measurements in a room temperature environment. The pressure equilibrium determination value was set to 0.005 psig/min by using a helium gas, and pretreatment was repeated 10 times at an introduction pressure of 19.5 psig, and then, measurement was repeated 10 times at an introduction pressure of 19.5 psig to determine the average value as the density of each material.

(4) Formability (Drawdown Resistance, Container Wall Thickness Distribution)

The difference in the thickness between the thickest part and the thinnest part of a container excepting the flange portion was checked at the time of pressure forming. A container having the difference of less than 300 μm was evaluated as "Formability ⊚". A container having the difference of not less than 300 μm and less than 400 μm was evaluated as "Formability ○". A container having the difference of not less than 400 μm was evaluated as "Formability Δ". When the drawdown was so large to cause bursting and make forming impossible, the result was evaluated as "Formability X".

(5) Heat-Resistant Shrinkage

Heat-resistant shrinkage of the produced container was determined based on the shrinkage calculated from the filled inner volume measured before and after heat sterilization treatment conducted at 121° C. for 30 minutes. When the shrinkage at this time is not less than 5%, the commercial value may be impaired due to deformation of the container. Taking this into consideration, a container having the shrinkage of not less than 5% was evaluated as "Heat-resistant shrinkage X". A container having the shrinkage of less than 5% and not less than 3% was evaluated as "Heat-resistant shrinkage ○", and a container having the shrinkage of less than 3% was evaluated as "Heat-resistant shrinkage ⊚".

(6) Impact Resistance

The impact resistance of the produced container was determined based on the result of a drop test. For the test, the container was filled with 215 g of water, sealed with an aluminum foil laminate film, and then, subjected to a shower type isobaric retort treatment under sterilization conditions of 121° C. for 30 minutes. After the retort treatment, the container was stored in an environment at 5° C. for 24 hours so as to be used as a sample. This sample was dropped from the height of 50 cm to hit the floor at the bottom surface, and leakage of water from the container was visually checked to determine whether the container was damaged. In this manner, each sample was dropped totally 10 times, and a container without leakage of water nor damage was evaluated as "Impact resistance ○" and a damaged container was evaluated as "Impact resistance X".

(7) Transparency (Haze)

The haze of the container body was measured using a haze meter (manufactured by Suga Test Instruments Co., Ltd.) in accordance with JIS K7136. In this embodiment, a container having a haze value of not less than 40% was evaluated as "Transparency X", a container having a haze value of less than 40% and not less than 30% was evaluated as "Transparency Δ", a container having a haze value of less than 30% was evaluated as "Transparency ○", and a container having a haze value of less than 10% was evaluated as "Transparency ⊚".

(8) Oxygen Barrier Property

The obtained container was filled with 1 g of pure water, sealed with an aluminum foil laminate film in a nitrogen-substituted glovebox, and then, subjected to a shower type isobaric retort treatment under sterilization conditions of 121° C. for 30 minutes. After the retort treatment, the container was stored in an environment of 80% RH at 30° C. After two weeks, the oxygen concentration in the container was measured by gas chromatograph. Since the content may have a risk of quality degradation if the oxygen concentration in the container is 1% or more, a container having oxygen concentration of not less than 1% was evaluated as "Barrier property X", a container having oxygen concentration of less than 1% and not less than 0.1% was evaluated as "Barrier property ○", and a container having oxygen concentration of less than 0.1% was evaluated as "Barrier property ⊚".

Example 1

A multilayer sheet was produced using a machine for forming a co-extruded multilayer sheet. The sheet was composed of: outermost layer of a propylene-based polymer A/inner layer/adhesive resin (AD) layer/ethylene-vinyl alcohol copolymer (EVOH) layer/AD layer/inner layer. The inner layer was formed of a resin composition prepared by blending a propylene-based polymer B and an ethylene-α-olefin copolymer C at a weight ratio of 90:10.

The resins composing the respective layers are specified below.

The propylene-based polymer A had MFR of 3.5 g/10 min, and I.I. of 98.2%. The propylene-based polymer B had MFR of 2.0 g/10 min, and I.I. of 96.7%. The ethylene-α-olefin copolymer C had MFR of 2.2 g/10 min and a density of 0.899 g/cm$^3$, and it contained 1-butene as α-olefin. The adhesive resin had MFR of 2.0 g/10 min.

The EVOH layer was formed of a resin composition prepared by blending EVOH (1) and EVOH (2) below at a weight ratio of 80:20.

EVOH (1) had an ethylene content of 27 mol % and MFR of 4.0 g/10 min (210° C.).

EVOH (2) had an ethylene content of 44 mol % and MFR of 3.3 g/10 min (210° C.).

The propylene-based polymer A and the propylene-based polymer B each contained 0.2 parts by weight of a crystal nucleating agent (organophosphate) per 100 parts by weight of the propylene-based polymer.

Subsequently, the thus prepared multilayer sheet was heated by a far-infrared heater so that the sheet surface temperature reached approximately 165° C. Using a plug-assisted pressure forming machine, the sheet was formed into a container having a ratio (L/D) of container height (L) to diameter (D) of 1.4.

The results of respective evaluations are shown in Table 1.

Example 2

A multilayer sheet was prepared and a container was formed in the same manner as in Example 1 except that a resin composition used for the inner layer was composed of the propylene-based polymer B, the ethylene-α-olefin copolymer C and a high melt tension propylene-based polymer D blended in a weight ratio of 80:10:10. The high melt tension propylene-based polymer D had MFR of 1 g/10 min. The results of respective evaluations are shown in Table 1.

The formability is superior to that in Example 1, probably because the drawdown resistance is improved due to addition of the high melt tension propylene-based polymer D having a long chain branched structure.

Example 3

A multilayer sheet was prepared and a container was formed in the same manner as in Example 2 except that the container was heated to approximately 170° C. at the time of forming. The results of respective evaluations are shown in Table 1.

The shrinkage resistance was superior to that in Example 2, probably because forming at a higher temperature served to hinder strains to remain.

Example 4

A multilayer sheet was prepared and a container was formed in the same manner as in Example 2 except that the container was heated to approximately 185° C. at the time of forming. The results of respective evaluations are shown in Table 1.

The heat-resistant shrinkage was superior to that in Example 2 probably because forming at a higher temperature served to hinder strains to remain. On the other hand, the heating at a high temperature increased the drawdown and degraded the formability, which impaired the glossiness of the sheet surface and degraded the transparency in comparison with Example 2.

Example 5

A multilayer sheet was prepared and a container was formed in the same manner as in Example 1 except that a resin having MFR of 0.5 g/10 min and I.I. of 98.3% was used as the propylene-based polymer B. The results of respective evaluations are shown in Table 1.

Example 6

A multilayer sheet was prepared and a container was formed in the same manner as in Example 5 except that the weight ratio of the propylene-based polymer B to the ethylene-α-olefin copolymer C was changed to 95:5. The results of respective evaluations are shown in Table 1.

Example 7

A multilayer sheet was prepared and a container was formed in the same manner as in Example 5 except that a resin having MFR of 2.0 g/10 min and a density of 0.917 g/cm$^3$ was used as the ethylene-α-olefin copolymer C, and a resin containing 4-methyl-1-pentene was used as the α-olefin. The results of respective evaluations are shown in Table 1.

Example 8

A multilayer sheet was prepared and a container was formed in the same manner as in Example 5 except that the resin composition used here was prepared by blending resins mentioned below at a weight ratio of 5:5. One of the resins contained an ethylene-α-olefin copolymer C having MFR of 2.2 g/10 min and a density of 0.899 g/cm$^3$, and 1-butene as the α-olefin. The other resin had MFR of 2.0 g/10 min and a density of 0.917 g/cm$^3$, and it contained 4-methyl-1-pentene as the α-olefin. The results of respective evaluations are shown in Table 1.

This container exhibited excellent impact resistance, probably because of the effect imparted by the compatibility between the propylene-based copolymer B and the two kinds of ethylene-α-olefin copolymers.

Example 9

A multilayer sheet was prepared and a container was formed in the same manner as in Example 5 except that a resin having MFR of 1.0 g/10 min (190° C.) and a density of 0.889 g/cm$^3$ was used as the ethylene-α-olefin copolymer C, and a resin containing 1-octene was used as the α-olefin. The results of respective evaluations are shown in Table 1.

Example 10

A container was formed in the same manner as in Example 5 except that the multilayer sheet was composed of: outermost layer of propylene-based polymer A/inner layer/AD layer/EVOH layer/oxygen-absorbing (Sc) layer/ EVOH layer/AD layer/adsorbent-containing layer/inner layer. The inner layer was formed of a resin composition prepared by blending the propylene-based polymer B and the ethylene-α-olefin copolymer C at a weight ratio of 90:10. The Sc layer contained the aforementioned blend of two kinds of EVO as a main component, and it contained also an oxidizing organic component and a transition metal catalyst. The adsorbent-containing layer contained polypropylene as a main component and also an adsorbent. The results of respective evaluations are shown in Table 1.

The barrier property in this Example was superior to that in Example 5 due to the Sc layer.

Comparative Example 1

A multilayer sheet was prepared and a container was formed in the same manner as in Example 1 except that a layer composed of the propylene-based polymer B was used as the inner layer. The results of respective evaluations are shown in Table 1.

The impact resistance was inferior since ethylene-α-olefin copolymer was not added.

Comparative Example 2

A multilayer sheet was prepared and a container was formed in the same manner as in Example 1 except that the container was heated at approximately 145° C. at the time of forming. The results of respective evaluations are shown in Table 1.

In comparison with Example 1, the container in this Comparative Example was formed at a lower temperature. As a result, more strains remained to degrade the heat-resistant shrinkage, and this made the container unsuitable for heat sterilization.

Comparative Example 3

A multilayer sheet was prepared and a container was formed in the same manner as in Example 1 except that the inner layer was composed of the propylene-based polymer B and heated at approximately 145° C. at the time of forming. The results of respective evaluations are shown in Table 1.

A container produced according to this Comparative Example was inferior in heat-resistant shrinkage and impact resistance in comparison with Example 1, and thus, the container was not suitable for heat sterilization.

Comparative Example 4

A multilayer sheet was prepared and a container was formed in the same manner as in Example 1 except that the sheet was composed of an outermost layer of the propylene-based polymer A and an inner layer, and the inner layer was a layer composed of the propylene-based polymer B. The results of respective evaluations are shown in Table 1.

The container having no EVOH layer had impact resistance superior to that in Example 1, but the barrier property was considerably inferior to that in Example 1.

Comparative Example 5

A multilayer sheet was prepared and a container was formed in the same manner as in Example 5 except that a resin having MFR of 0.5 g/10 min and I.I. of 98.3% was used as the propylene-based polymer A. The results of respective evaluations are shown in Table 1.

Since the propylene-based polymer used for the outermost layer had MFR of 0.5 g/10 min, the glossiness was degraded and the transparency was inferior to that in Example 5.

Comparative Example 6

A multilayer sheet was prepared and a container was formed in the same manner as in Example 2 except that a resin having MFR of 2.3 g/10 min and I.I. of 92.8% was used as the propylene-based polymer B. The results of respective evaluations are shown in Table 1.

Since the propylene-based polymer had a low isotactic index, the drawdown was large to cause bursting and make forming impossible, thereby degrading the formability.

Comparative Example 7

A multilayer sheet was prepared and a container was formed in the same manner as in Example 1 except that the inner layer was a layer composed of a random copolymer of propylene and α-olefin. The random copolymer had MFR of 1.0 g/10 min, and 0.2 parts by weight of a crystalline nucleating agent (organophosphate) was added to 100 parts by weight of the random copolymer. The results of respective evaluations are shown in Table 1.

Since the random copolymer had a low melting point, the drawdown was large to cause bursting and make forming impossible, thereby degrading the formability.

Comparative Example 8

A multilayer sheet was prepared and a container was formed in the same manner as in Example 1 except that the inner layer was a layer composed of a block copolymer containing a copolymer rubber component of propylene and α-olefin. The block copolymer had MFR of 0.5 g/10 min, and 0.2 parts by weight of a crystal nucleating agent (organophosphate) was added to 100 parts by weight of the block copolymer. The results of respective evaluations are shown in Table 1.

It is shown that use of the block copolymer degraded the transparency.

TABLE 1-1

| | Outermost layer Propylene-based polymer A | | Inner layer | | | | | | | High melt tension propylene-based polymer D | |
|---|---|---|---|---|---|---|---|---|---|---|---|
| | | | Propylene-based polymer B | | | Ethylene-α-olefin copolymer C | | | | | |
| | MFR g/10 min | I. I. % | MFR g/10 min | I. I. % | Blend amount wt % | MFR g/10 min | Density g/cm³ | | Blend amount wt % | MFR g/10 min | Blend amount wt % |
| Ex. 1 | 3.5 | 98.2 | 2.0 | 96.7 | 90 | 2.2 | 0.899 | 1-butene | 10 | | |
| Ex. 2 | 3.5 | 98.2 | 2.0 | 96.7 | 80 | 2.2 | 0.899 | 1-butene | 10 | 1.0 | 10 |
| Ex. 3 | 3.5 | 98.2 | 2.0 | 96.7 | 80 | 2.2 | 0.899 | 1-butene | 10 | 1.0 | 10 |
| Ex. 4 | 3.5 | 98.2 | 2.0 | 96.7 | 80 | 2.2 | 0.899 | 1-butene | 10 | 1.0 | 10 |
| Ex. 5 | 3.5 | 98.2 | 0.5 | 98.3 | 90 | 2.2 | 0.899 | 1-butene | 10 | | |
| Ex. 6 | 3.5 | 98.2 | 0.5 | 98.3 | 95 | 2.2 | 0.899 | 1-butene | 5 | | |
| Ex. 7 | 3.5 | 98.2 | 0.5 | 98.3 | 90 | 2.0 | 0.917 | 4-methyl-1-pentene | 10 | | |
| Ex. 8 | 3 5 | 98.2 | 0.5 | 98.3 | 90 | 2.2 | 0 899 | 1-butene | 5 | | |
| | | | | | | 2.0 | 0.917 | 4-methy-1-pentene | 5 | | |
| Ex. 9 | 3.5 | 98.2 | 0.5 | 98.3 | 90 | 1.0 | 0.889 | 1-octene | 10 | | |
| Ex. 10 | 3.5 | 98.2 | 0.5 | 98.3 | 90 | 2.2 | 0.899 | 1-butene | 10 | | |

Ex.: Example

TABLE 1-2

| | Barrier layer Ethylene-vinyl alcohol copolymer | Forming Sheet temperature °C. | Performance evaluation | | | | |
|---|---|---|---|---|---|---|---|
| | | | Formability | Heat-resistant shrinkage | Impact resistance | Transparency | Barrier property |
| Ex 1 | EVOH | 165 | ○ | ○ | ○ | ○ | ○ |
| Ex 2 | EVOH | 165 | ◎ | ○ | ○ | ○ | ○ |
| Ex 3 | EVOH | 170 | ○ | ◎ | ○ | ○ | ○ |
| Ex. 4 | EVOH | 185 | Δ | ◎ | ○ | Δ | ○ |
| Ex. 5 | EVOH | 165 | ○ | ○ | ○ | ○ | ○ |
| Ex. 6 | EVOH | 165 | ○ | ○ | ○ | ○ | ○ |
| Ex. 7 | EVOH | 165 | ○ | ○ | ○ | ○ | ○ |
| Ex. 8 | EVOH | 165 | ○ | ○ | ◎ | ○ | ○ |
| Ex. 9 | EVOH | 165 | ○ | ○ | ◎ | ○ | ○ |
| Ex. 10 | EVOH + Sc | 165 | ○ | ○ | ○ | ○ | ◎ |

Ex.: Example

TABLE 1-3

| | Outermost layer Propylene-based polymer A | | Inner layer | | | | | | | High melt tension propylene-based polymer D | |
|---|---|---|---|---|---|---|---|---|---|---|---|
| | | | Propylene-based polymer B | | | Ethylene-α-olefin copolymer C | | | | | |
| | MFR g/10 min | I. I. % | MFR g/10 min | I. I. % | Blend amount wt % | MFR g/10 min | Density g/cm³ | α-olefin | Blend amount wt % | MFR g/10 min | Blend amount wt % |
| Com. Ex. 1 | 3.5 | 98.2 | 2.0 | 96.7 | 100 | | | | | | |
| Com. Ex. 2 | 3.5 | 98.2 | 2.0 | 96.7 | 90 | 2.2 | 0.899 | 1-butene | 10 | | |
| Com. Ex. 3 | 3.5 | 98.2 | 2.0 | 96.7 | 100 | | | | | | |
| Com. Ex. 4 | 3.5 | 98.2 | 2.0 | 96.7 | 100 | | | | | | |
| Com. Ex. 5 | 0.5 | 98.3 | 0.5 | 98.3 | 90 | 2.2 | 0.899 | 1-butene | 10 | | |

-continued

| | | | | | | | | | | | |
|---|---|---|---|---|---|---|---|---|---|---|---|
| Com. Ex. 6 | 3.5 | 98.2 | 2.3 | 92.8 | 80 | 2.2 | 0.899 | 1-butene | 10 | 1.0 | 10 |
| Com. Ex. 7 | 3.5 | 98.2 | 1.0 | Random copoymer | 100 | | | | | | |
| Com. Ex. 8 | 3.5 | 98.2 | 0.5 | Block copoymer | 100 | | | | | | |

Com. Ex.: Comparative Example

TABLE 1-4

| | Barrier layer Ethylene-vinyl alcohol copolymer | Forming Sheet temperature ° C. | Performance evaulation | | | | |
|---|---|---|---|---|---|---|---|
| | | | Formability | Heat-resistant shrinkage | Impact resistance | Transparency | Barrier property |
| Com. Ex. 1 | EVOH | 165 | ○ | ○ | × | ◉ | ○ |
| Com. Ex. 2 | EVOH | 145 | ○ | × | ○ | ○ | ○ |
| Com. Ex. 3 | EVOH | 145 | ○ | × | × | ◉ | ○ |
| Com. Ex. 4 | — | 165 | ○ | ○ | ○ | ○ | × |
| Com. Ex. 5 | EVOH | 165 | ○ | ○ | ○ | × | ○ |
| Com. Ex. 6 | EVOH | 165 | × | | | | |
| Com. Ex. 7 | EVOH | 165 | × | | | | |
| Com. Ex. 8 | EVOH | 165 | ○ | ○ | ○ | × | ○ |

Com. Ex.: Comparative Example

INDUSTRIAL APPLICABILITY

The multilayer container of the present invention is excellent in surface glossiness and impact resistance, and the container can be used for retort sterilization. Moreover, the multilayer container provided with additional layers such as a gas barrier layer and an oxygen absorbing layer can exhibit excellent oxygen barrier property for a long period of time. Even when a content to be contained in the container has a flavor that may be degraded by an oxidative decomposition product generated by an oxygen absorption reaction, the container can effectively prevent degradation of the flavor. Therefore, the container can be used effectively to contain various contents such as beverages and food products, particularly contents to be subjected to heat sterilization like retort sterilization.

Specific examples of the contents that can be contained in the container include: beverages such as beer, wine, fruit juice, and carbonated soft drinks; fruits; nuts; vegetables; meat products; infant foods; coffee; jam; mayonnaise; ketchup; edible oil; dressing; sauces; tsukudani (preservable vegetable/meat/fish boiled down in soy sauce); dairy products; processed fish products; baby foods; and pet foods. Furthermore, the container can be used suitably for various contents such as medicines, cosmetics, and petrol that can deteriorate due to oxygen.

EXPLANATIONS OF LETTERS OR NUMERALS

1 Outermost layer

2 Inner layer

3 Gas barrier layer

4 Adhesive layer

Layer of propylene-based polymer B

6 oxygen absorbing layer

7 Regrind layer

8 Adsorbent-containing layer

The invention claimed is:

1. A heat-resistant multilayer container comprising:
an outermost layer comprising a propylene-based polymer A containing homopolypropylene in an amount of not less than 80% by weight having a melt flow rate in a range of 2.0 to 10.0 g/10 min,
an inner layer comprising 50 to 99% by weight of a propylene-based polymer B containing homopolypropylene in an amount of not less than 80% by weight having a melt flow rate of not more than 5.0 g/10 min and an isotactic index of not less than 93%, and 1 to 50% by weight of an ethylene-α-olefin copolymer C, and
a barrier layer occupying 5 to 20% by weight of the whole container,
the multilayer container has a ratio (L/D) of container height (L) to diameter (D) of not less than 0.5, and a volume shrinkage of not more than 5% based on volume measured before and after heat sterilization at 121° C. for 30 minutes.

2. The heat-resistant multilayer container according to claim 1, wherein the inner layer comprises a high melt tension polypropylene D in an amount of 1 to 20% by weight.

3. The heat-resistant multilayer container according to claim 1, wherein the propylene-based polymer A and/or the propylene-based polymer B contains 0.001 to 5 parts by weight of crystal nucleating agent per 100 parts by weight of each of the propylene-based polymer A and the propylene-based polymer B.

4. The heat-resistant multilayer container according to claim 1, wherein the barrier layer is composed of an ethylene-vinyl alcohol copolymer, or comprises an ethylene-vinyl alcohol copolymer as a blend of at least two types of ethylene-vinyl alcohol copolymers different from each other in ethylene contents.

5. The heat-resistant multilayer container according to claim 1, wherein the ethylene-α-olefin copolymer C is a resin composition comprising a blend of at least two types of ethylene-α-olefin copolymers of α-olefins different from each other in carbon numbers.

6. The heat-resistant multilayer container according to claim 1, wherein the barrier layer is an oxygen-absorbing barrier layer.

7. A method for producing a heat-resistant multilayer container, the method comprising:
- preparing a multilayer sheet comprising:
  - an outermost layer comprising a propylene-based polymer A containing homopolypropylene in an amount of not less than 80% by weight having a melt flow rate in a range of 2.0 to 10.0 g/10 min,
  - an inner layer comprising 50 to 99% by weight of a propylene-based polymer B containing homopolypropylene in an amount of not less than 80% by weight having a melt flow rate of not more than 5.0 g/10 min and an isotactic index of not less than 93%, and 1 to 50% by weight of an ethylene-α-olefin copolymer C, and
  - a barrier layer occupying 5 to 20% by weight of the whole container,
- heating the multilayer sheet to a temperature in a range of 150 to 190° C., and
- thermoforming the sheet to have a deep-drawn shape having a ratio (L/D) of container height (L) to diameter (D) of not less than 0.5.

8. The method for producing a heat-resistant multilayer container according to claim 7, wherein the thermoforming is pressure forming.

* * * * *